United States Patent [19]

Land

[11] 4,091,400
[45] May 23, 1978

[54] MULTIPLE BATTERY CAMERA

[75] Inventor: Edwin H. Land, Cambridge, Mass.

[73] Assignee: Polaroid Corporation, Cambridge, Mass.

[21] Appl. No.: 757,993

[22] Filed: Jan. 10, 1977

[51] Int. Cl.² .................... G03B 17/00; G03B 1/18; G03B 7/16
[52] U.S. Cl. ........................... 354/202; 354/32; 354/145; 354/171
[58] Field of Search ............ 354/126, 149, 170, 173, 354/202, 354, 171, 145, 83, 23 R, 212; 307/48, 50, 71, 80, 85, 86, 81; 320/2, 6–8, 15, 16, 30, 31

[56] References Cited

U.S. PATENT DOCUMENTS

| 3,477,026 | 11/1969 | Plugge | 307/80 |
| 3,487,229 | 12/1969 | Krausz | 307/71 |
| 3,587,425 | 6/1971 | Biber | 354/149 |
| 3,853,396 | 12/1974 | Ogiso et al. | 354/173 |
| 4,015,198 | 3/1977 | Iwashita et al. | 354/173 |

Primary Examiner—L. T. Hix
Assistant Examiner—William B. Perkey
Attorney, Agent, or Firm—Edward S. Roman

[57] ABSTRACT

A first battery powers the electrical system of an automatic photographic camera throughout each cycle of operation. A second camera battery is normally electrically isolated, and is connected with the first battery selectively during each operating cycle, especially during conditions of relatively high power drain, to ensure reliable battery power.

5 Claims, 6 Drawing Figures

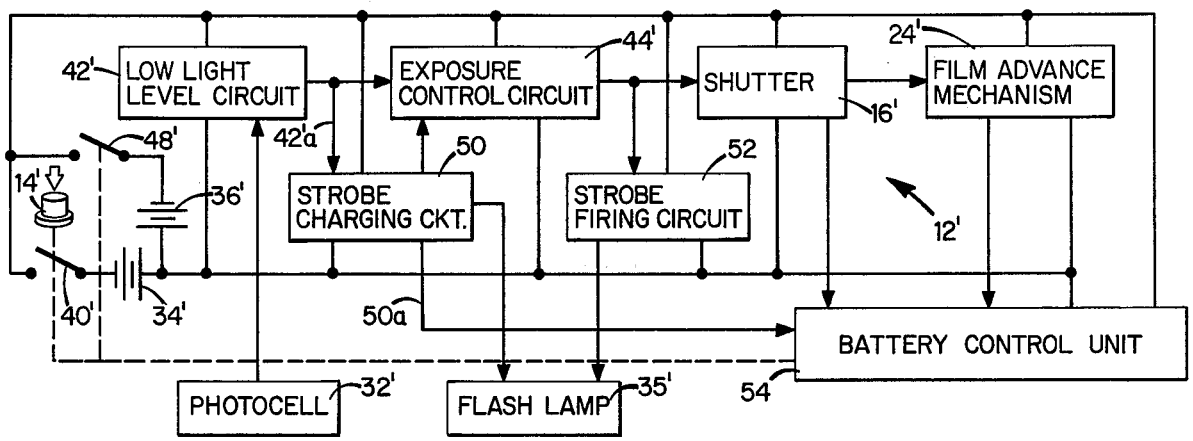
FIG. 5.
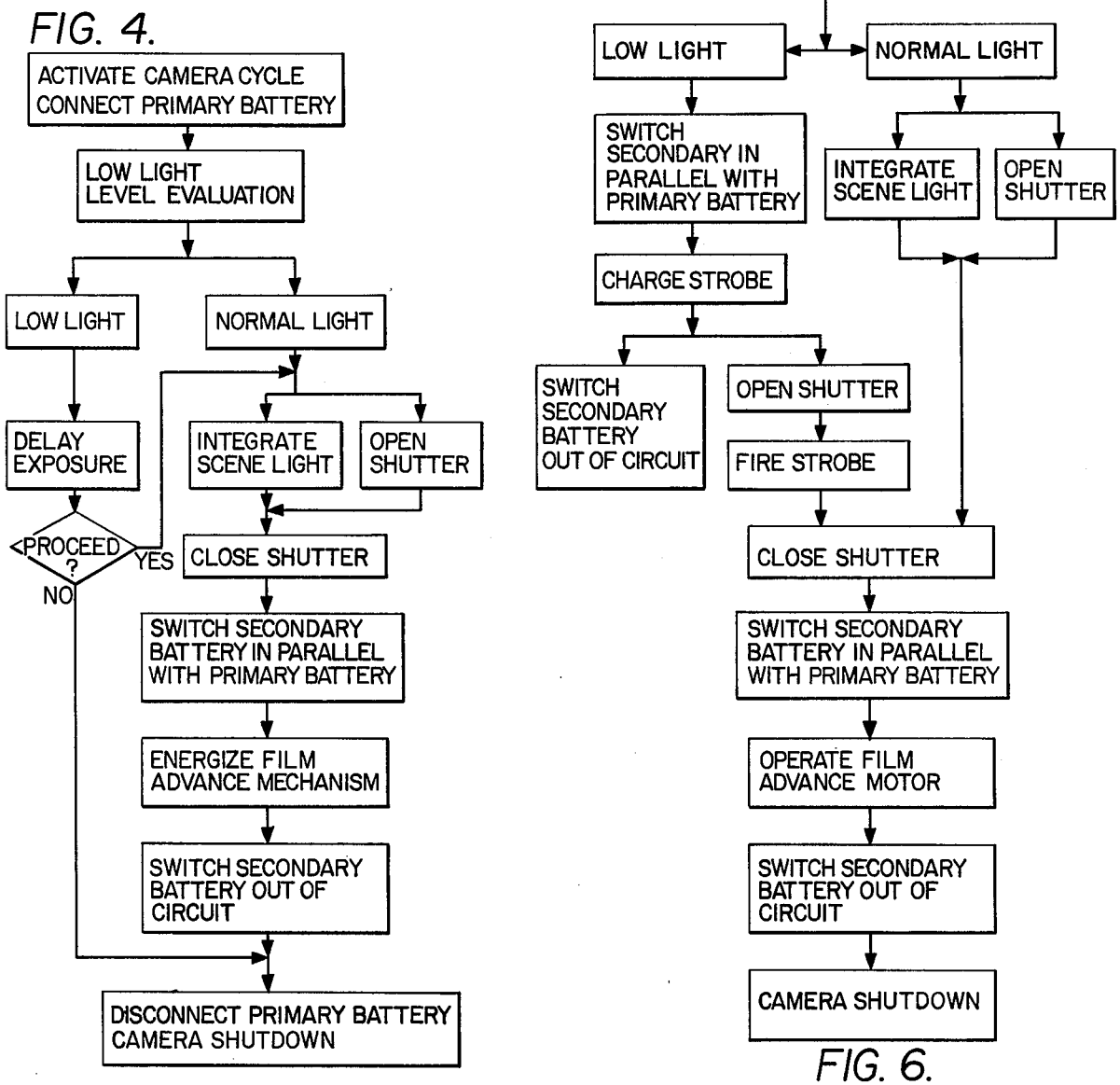
FIG. 4.
FIG. 6.

MULTIPLE BATTERY CAMERA

BACKGROUND

This invention relates to photographic cameras which incorporate automatic electrical systems that operate with periods of relatively high power consumption and of low power consumption. The invention provides a multiple battery supply for powering such electrical systems with high reliability against deficient battery power.

Modern cameras often include electrical systems which set the exposure time, adjust the camera aperture, control the camera shutter, and/or advance the film. In self-developing cameras such electrical systems transport an exposed film unit through processing-initiating spread rolls, and eject it from the camera. The electrical power drain which these systems impose on the camera battery can increase significantly during a camera operating cycle according to the number and the nature of the electrical and electronic functions in the camera. For example, automatic exposure timing and even shutter adjustment typically consume relatively little battery power, whereas the mechanical drive for film advance consumes significantly more power.

A weak camera battery often can drive the electrical system during low power operations, and evidence failure only during a high load or peak power portion of the camera cycle. Thus, a camera with a weak battery can nevertheless commence an operating cycle which starts with low power operations, but will not properly perform the subsequent high power operations such as film advance after exposure. The resultant operating failure and loss of one or more exposures are at the least annoying, and can involve more serious consequences particularly where the user collapses a folding camera which has halted operation in mid-cycle. Further, replacement of a weakened battery while the camera still contains unexposed film can lead to loss of one frame or of all the unexposed film, depending on how the battery is packaged within the camera and relative to the packaging of the film.

The occurrence of these and other battery failure problems are difficult to rule out, because batteries fail due to many factors, including undue dealer storage, improper user care, and exposure to excessive temperature.

Prior art efforts to diminish the battery problem can include low power indicators, and the use of multiple batteries. Thus, two batteries can be placed in series to produce a high voltage useful, for example, for film advance. More often, the batteries are connected electrically in parallel to augment the current supply for high drain operations. The continued parallel connection of a fresh battery with a weak one, however, can diminish the operating life of the fresh battery far below the expected life. U.S. Pat. Nos. 3,853,396 and 3,587,425; and German specification No. 2,457,002 are among the prior art which disclose these and other battery schemes for powering camera operations.

With the foregoing in mind, it is an object of this invention to provide a multiple battery supply for camera electrical systems and which operates with relatively high reliance against failure due to a deficient battery.

Another object of the invention is to provide a novel connection of batteries within a camera whereby the premature aging of one battery does not degrade the performance of another battery. It is also an object to provide a camera system which obtains reliable and long battery operation irrespective of premature aging of another battery of the camera system. Further objects of the invention are to provide an inexpensive and relatively simple system of the above character.

Yet another object of the invention is to provide a novel connection of batteries within a camera wherein a weak battery can drive the camera in a low power drain state, and another battery can selectively drive the camera in a high power drain state.

Other objects of the invention will in part be obvious and will in part appear hereinafter.

SUMMARY OF THE INVENTION

According to the invention, a photographic camera incorporating a battery-powered electrical system has a first battery connected to power the system throughout the operating cycle, and has a second battery which is normally disconnected to be isolated from the electrical system and from the first battery. However, a switch element automatically connects the second battery electrically in parallel with the first battery during intervals of high power consumption in the operating cycle. In one preferred embodiment, operation with relatively high power drain continues from initiation through to the end of the electrical system operating cycle; hence the second battery remains connected to ensure that the electrical system completes an operating cycle which the first battery has sufficient strength to commence.

The foregoing selective connection of the second battery with the camera electrical system ensures that the system receives enough power to perform high drain operations. The isolation of the second battery from the electrical system, and from the first battery, enhances the likelihood that it will maintain sufficient stored power to operate the camera electrical system, and not be drained by a weakened or defective first battery or by a short-circuit type malfunction in the electrical system. The invention thus significantly diminishes the likelihood that the user will encounter a loss of battery power, particularly during an operating sequence. The user is thus spared of lost exposures, wasted film and the potential of more serious consequences involving the camera itself.

The invention accordingly comprises the features of construction, combinations of elements, and arrangement of parts exemplified in the constructions hereinafter set forth, and the several steps and the relation of one or more of such steps with respect to each of the others which the apparatus can perform, and the scope of the invention is indicated in the claims.

DESCRIPTION OF THE DRAWINGS

For a fuller understanding of the nature and objects of the invention, reference should be made to the following detailed description and the accompanying drawings, in which:

FIG. 4 is a sequential flow diagram of the operation for the electrical system of FIG. 3;

FIG. 5 is a functional block diagram of another camera electrical system according to the invention; and FIG. 6 is a sequential flow diagram for the electrical system of FIG. 5.

DESCRIPTION OF ILLUSTRATED EMBODIMENTS

Figure 1:
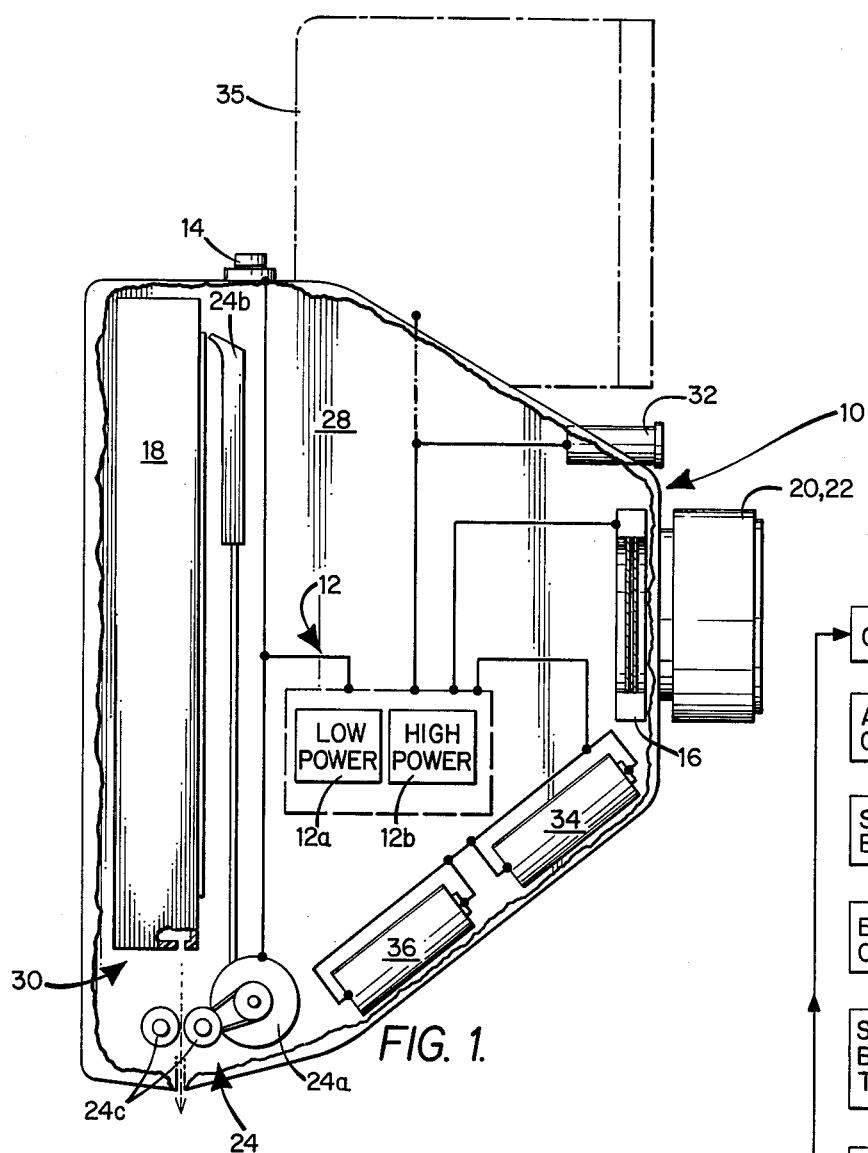
FIG. 1 is a simplified diagrammatic showing, in side elevation partly broken away, of a camera incorporating features of the invention.

FIG. 1 shows a camera 10 typical of those having an automatic electrical system 12 with different power requirements at different times in an operating cycle. The camera is illustrated as of the self-developing type, but the invention can be used with other types of cameras. As conventional, for example, with the self-developing cameras which the Polaroid Corporation markets under the registered designations SX-70 and PRONTO!, when the user depresses a shutter release button 14, the camera 10 automatically exposes through a shutter 16 a film unit packaged in a film cassette 18. The shutter is behind a lens 20 which may be fitted with an adjustable aperture 22. After exposure, a film advance mechanism 24 powered by a motor 24a advances the exposed film unit out of the cassette with a pick mechanism 24b, and transports it to the bite between a pair of press rolls 24c which initiate photoprocessing and then eject the film unit from the camera. A housing 28 forms the camera body which mounts the foregoing elements and includes a compartment 30 which replaceably and removably seats the film cassette 18.

The camera electrical system 12 is diagrammatically illustrated as having low power circuits 12a and high power circuits 12b. The former includes, for example, circuits which operate with the shutter release button 14 and elements of the shutter 16 mechanism; and the latter includes elements of the film advance mechanism 24, all of which are shown electrically connected in the system 12. A photocell 32, which receives light from the camera field of view, is connected with the illustrated system 12, and a flash unit 35 is shown and connected with dashed lines. As also shown, the camera has a first battery 34 and a second battery 36, each arranged for selective connection with the electrical system 12. Although the batteries are shown separate from the film cassette 18, either one can be packaged in the cassette and typically the battery 34 is provided in this manner. (The electrical connections in FIG. 1 are diagrammatic only, and reference should be made to other Figures and this description for operative interconnections.)

The designation of the system 12 as having low power circuits and high power circuits corresponds with the battery power which the electrical elements of the camera system 12 draw during operation. That is, the system, which operates with a multiple-step cycle for each exposure, consumes relatively low battery power during some operations in each cycle, and draws significantly more battery power during other operations. By way of specific example, when the electrical system is quiescent, the power drain is essentially zero. During typical initial exposure control operations, initiated when the shutter release is depressed, the power consumption is relatively low. On the other hand, during film transport and processing operations, when the film advance mechanism 24 is operating, the power consumption is significantly higher.

In accordance with the invention, the camera draws power from the first battery 34 continuously during each operating cycle and normally maintains the second battery 36 disconnected from both the electrical system and from the first battery 34. However, during one or more selected times in the operating cycle, including times of high power consumption, the second battery 36 is applied electrically in parallel with the first battery to provide power for the electrical system.

Figure 2:
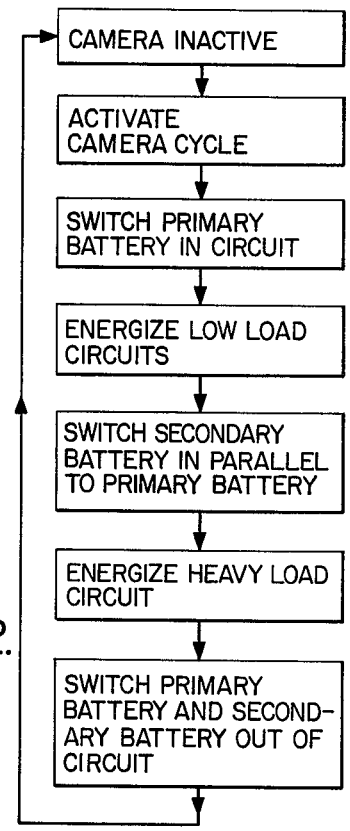
FIG. 2 is a sequential flow diagram of a sequence of operating steps according to the invention.

FIG. 2 illustrates such a camera operating sequence with the two batteries 34 and 36. As diagrammed, the camera is initially inactive, and draws no electrical power. The user activates the camera cycle by pressing the shutter release button 14, and a first step is to switch the primary battery 34 in circuit to power the electrical system 12. The electrical system operates the low load circuits 12a, which in the illustrated embodiment include the exposure control elements of the camera. Prior to operating the high power or heavy load circuits 12b, the electrical system switches the second battery 36, which up to now has remained electrically isolated from the electrical system and the first battery, in parallel with the first battery 34. In the illustrated embodiment, the high power operations include advancing the exposed film unit out of the film cassette with the pick mechanism 24b and driving it through the rolls 24c, all by operation of the motor 24a. Upon completion of these operations, the exposed film unit has been discharged from the camera and a fresh film unit is ready for exposure in the cassette 18. Accordingly, the film advance mechanism is turned off, and assuming there is no other high drain electrical requirement, the second battery 36 is switched out of the circuit. At the end of the camera cycle, the first battery 34 is disconnected from the electrical system 12, and the camera reverts to the inactive condition.

Thus, during a complete cycle of the illustrated camera, the first battery 34, which is selected to provide sufficient power for operating the entire camera electrical system throughout a number of film exposing cycles, is connected to drive all elements of the electrical system 12. The second battery 36, which also is selected to have sufficient power for driving all elements of the camera electrical system, is electrically isolated so that normally no current is drawn from it. The selective connection of this second battery to power the electrical system 12 together with the first battery 34, during conditions of relatively high electrical power consumption, ensures adequate battery power for the electrical system while protecting the second battery 36 from being discharged at other times, particularly if the first battery is weak. Conversely, if the second battery is weak, such selective connection also protects the first battery from being discharged by the second battery.

Alternative to connecting the second battery 36 with the first battery 34 automatically to power the electrical system during all operations of high battery power consumption, other switching logic can be employed. For example, a switching circuit can connect the second battery in parallel with the first battery only when the voltage from the first battery drops below a selected level, or when the current from the first battery exceeds a selected level, or in response to a combination of first battery current and voltage. In addition, the switching circuit can connect the second battery in parallel with the first battery solely in response to the user depressing the button 14 to actuate the automatic exposure cycle. Those skilled in the art can implement these battery switching operations with available circuits according to known procedures.

Figure 3:
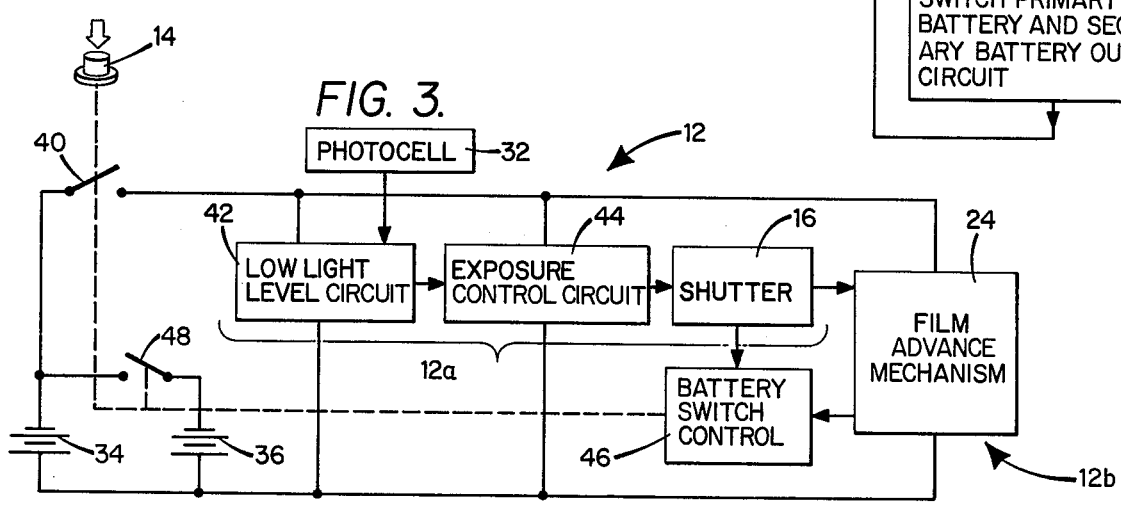
FIG. 3 is a functional block diagram of an electrical system for use in the camera of FIG. 1.

FIG. 3 shows an embodiment of the camera 10 electrical system 12 in which a normally-open switch 40 is coupled to be closed upon actuation of the shutter release button, and remains latched, as by conventional electronic or mechanical elements, until the operating cycle ends. The switch 40, when closed, applies the battery 34 in parallel to a low light level circuit 42, an exposure control circuit 44, and the electrical elements of the film advance mechanism 24. A battery switch control element 46 selectively closes and alternatively releases a normally-open switch 48; when closed the switch connects the second battery 36 electrically in parallel with the first battery 34. Otherwise the battery 36 is disconnected from any load or other drain and hence is electrically isolated.

When the user depresses the shutter release button 14, which latches switch 40 closed and thereby initiates a camera operating cycle, the first battery 34 applies operating power through the closed switch 40 to the circuits 42 and 44 and to the mechanism 24. The energized low light level circuit 42 measures with photocell 32 whether sufficient light exists to expose the film properly. When there is sufficient light, the circuit 42 signals the exposure control circuit 44 to perform the exposure with the shutter 16. On the other hand, when the circuit 42 determines that there is insufficient light, it can initiate one of numerous operating sequences or simply halt operation, in a manner and with mechanisms well known in the art. By way of illustrative example, the low level circuit 42 can delay exposure and other further operation, whereupon the camera cycle ends if the user during the delay time releases the shutter button 14. However, if the button 14 remains depressed at the end of the delay period, the low level circuit signals the exposure control circuit 44 to operate the shutter 16.

Upon being signalled by the low level circuit 42, the exposure control circuit 44 opens the shutter 16 for an exposure time dependent on the level of light which the exposure circuit measures through the camera lens. The closure of the shutter 16 mechanism actuates the film advance mechanism 24 and actuates the battery switch control unit 46 to close the normally-open switch 48. This connects the normally-isolated second battery 36 electrically in parallel with the first battery 34. The control unit 46 continues to maintain the switch 48 closed while the film advance mechanism 24 operates the pick mechanism 24b (FIG. 1) to index the exposed film unit out of the cassette 18 and during the succeeding operation where the press rolls engage the exposed film unit to initiate photographic processing and to transport it from the camera 10. Upon completion of these film transporting and processing operations, the mechanism 24 signals the control unit 46 to release or otherwise open both switches 40 and 48. These switch openings disconnect the second battery 36 from the electrical system 12 as well as from the first battery 34, and disconnect the latter battery from the electrical system.

The flow chart of FIG. 4 summarizes the foregoing operation of the FIG. 1 camera 10 with the electrical system of FIG. 3. The camera cycle is actuated by depressing the shutter control 14 which causes the first battery to be connected to the electrical elements. After the low light level determination with circuit 42, the sequence either jumps to the last step and no exposure is made, or the shutter is opened to initiate an exposure. The exposure control circuit 44 closes the shutter after the proper exposure. Closure of the shutter causes the second battery to be connected in parallel with the first battery and actuates the film advance mechanism 24; in particular it turns on the film transport motor. The electrical system is now changed from the initial operating state, which is a state of relatively low power consumption, to a state of high power consumption, and accordingly the second battery 36 together with the primary battery are connected for powering it. At the end of the film advance and processing steps, the second battery is disconnected and returned to its normally electrically-isolated condition, and the primary battery is disconnected from the electrical system. The camera reverts to the inactive, shut-down condition.

With this operating sequence, the second battery 36 remains isolated and only the first battery 34 is connected with the electrical system during low power operations such as light measurement and exposure control. The second battery 36 is connected in circuit with the first battery 34 for powering the electrical system only during high power operations. The isolation of the second battery 36 at all other times, whether during a camera exposure cycle or when the camera electrical system is inactive, protects it from discharge due to a weakened condition of the first battery. Similarly, power dissipating faults in the electrical system do not degrade the isolated second battery. Further, the illustrated operating cycle ends with operations of heavy power consumption. Accordingly, the second battery 36 powers the electrical system, together with the first battery 34, from the initiation of the high power operations through to the end of the operating cycle. This has the advantage of ensuring not only that the operations of high electrical drain are adequately powered, but further that the electrical system has adequate power for completion of the operating cycle.

FIGS. 5 and 6 illustrate an embodiment of the invention in which a camera has an electrical system which can operate with two time independent and generally nonoverlapping intervals of relatively high electrical power consumption in a single operating cycle. The camera 10 of FIG. 1, which operates in a high-power state during automatic film advance, can operate in this manner when the strobe lamp 35 is in use. For this operation, the camera electrical system is similar to that of FIG. 3 with the addition of strobe controlling circuits 50 and 52, and a modified battery control unit 54. The two strobe circuits are connected to receive battery power in parallel with the elements 42', 44' and 24'. (Elements of prior figures which appear in FIG. 5 are designated with the same reference numeral plus a superscript prime.)

Prior to the initiation of a camera cycle with the system of FIG. 5, the electrical system is at rest and the primary battery 34' and the secondary battery 36' are electrically isolated from each other and from the camera electrical system 12'. Upon initiation of the camera cycle by means of the shutter release button 14', the now-closed switch 40' connects the primary battery 34' to power the electrical system. As FIG. 6 shows, with these steps the camera cycle is activated and the first operation is the low light evaluation, which the low light level circuit 42 performs in response to the light-responsive signal from the photocell 32'. Where sufficient light is available for a proper exposure, as designated in FIG. 6 with a "Normal Light" legend, the circuit 42' signals the exposure control circuit 44' to initiate an automatically-timed exposure. The circuit 44' accordingly opens the shutter 16' and integrates the light detected from the field of view to determine the time for automatically closing the shutter.

As with the system of FIG. 3, upon closure of the shutter, the shutter 16' mechanism signals the battery control unit 54 to close the normally-open switch 48' and apply the secondary battery 36' in parallel with the primary battery 34'. The shutter closure also actuates the film advance mechanism 24' to transport and initiate processing of the exposed film unit, which also readies the next film unit for exposure. At the end of these operations, the film advance mechanism 24' provides a signal to the control unit 54 to open the switch 48' and thereby return the secondary battery 36' to its normally disconnected isolated condition and, further, to disconnect the primary battery 34' from the system by way of the switch 40'.

When, on the other hand, the circuit 42' determines that the light level is insufficient to expose a film unit properly at the time the shutter button is depressed, as indicated in FIG. 6 with a "Low Light" determination, the FIG. 5 system 12' employs the strobe charging circuit 50 to charge the strobe lamp 35 and subsequently flashes the lamp by way of the strobe firing circuit 52. More particularly, the signal indicating insufficient light, which the low level light circuit 42' produces on line 42'a, actuates the strobe charging circuit 50 to ready the lamp 35 for flash illumination. This operation draws significant battery current and accordingly is another example of an operation involving high power consumption. Accordingly, actuating the charging circuit 50 also causes it to signal the battery control unit 54, by way of conductor 50a, to switch the secondary battery 36' by way of switch 48' to power the electrical system 12' together with the primary battery 34'. Both batteries thus power the strobe charging circuit to prepare the flash lamp for a flash exposure.

When the flash lamp 35 is charged, the charging circuit 50 removes the signal on line 50a and signals the exposure control circuit 44' via line 50b to commence the exposure operation. In response to removal of the signal on line 50a, the battery control unit 54 allows switch 48' to open, thereby returning the secondary battery 36' to its normally-isolated condition. The exposure control circuit 44' responds to the strobe ready signal from the circuit 50 and signals the shutter 16 mechanism to open the shutter. It also signals the strobe firing circuit 52 to actuate the flash lamp. The duration of the open shutter and correspondingly of the exposure can be fixed, as the sequence of FIG. 6 shows, or can be controlled by again employing the exposure control circuit 42' to monitor the light reflected from the subject and close the shutter accordingly.

In either event, upon closure of the shutter, the electrical system 12' resumes the operation previously discussed as illustrated in FIG. 6 to transport and process the exposed film unit and ready a fresh film unit for exposure.

The camera electrical systems embodying the invention as described above with reference to the functional block diagrams and flow charts can be constructed in conventional form as found for example in presently-available cameras. Such cameras employ automatic film advance, automatic exposure timing, automatic aperture adjustment, and automatic flash timing. In addition, self-developing cameras are available with both automatic exposure control, and automatic film transport and processing. Those skilled in this art can apply these known constructions to the practice of this invention with only conventional skills. The electronic portions of the electrical systems, including the switches as well as the FIG. 3 circuits 42, 44 and 46 and the FIG. 5 circuits 50, 52 and 54, typically employ solid state devices. These can be combined with electro-mechanical latches and linkages commonly found in the photographic camera art.

The invention can be employed in camera systems having operating characteristics different from those illustrated above. For example, the invention can be used with a camera electrical system in which there is a continuous trickle current or low power drain at times other than during an exposure cycle. This can occur where the light measuring elements are operative outside the exposure cycle. With reference for example to FIG. 3, in these circumstances, the primary battery 34 can be connected across some or all elements of the electrical system without the switch 40 to produce the necessary stand-by current. The secondary battery 36, however, is electrically isolated from the electrical system during these times of stand-by operation, as during other times of low power operation. It should also be understood that each battery 34 and 36 can be provided as a single battery or as an interconnected set of several batteries.

Illustrative of a further variation is to connect the battery switch control unit 46 of FIG. 3 to receive a signal responsive to the voltage of the first battery 34, or to the current drawn from that battery (or even to receive signals responsive to both the battery current and voltage). In response to this signal or signals, the control unit can switch the second battery 36 selectively to power the electrical system when these monitored parameters of the first battery indicate that the electrical system is unduly loading the first battery.

It will thus be seen that the objects set forth above, among those made apparent from the preceding description, are efficiently attained by providing two sets of batteries in a camera, one of which powers the camera electrical system continuously during the operating cycle, and the other of which is normally isolated from any load and powers the electrical system together with the first set of batteries only at selected operating times, which normally includes times of high current drain or high power consumption. In one specific embodiment, the first and second battery sets are stored within the camera body. In another specific embodiment, the first battery set may be packaged with self-developing film units and hence stored in the film compartment of the camera, with the camera housing the second battery set elsewhere in the camera body outside the film compartment. Since certain changes can be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described the invention, what is claimed as new and secured by Letters Patent is:

1. A photographic camera of the type powered by at least two batteries comprising:
selectively actuable means at least in part electrically energizable for conducting an automatic cycle of operation responsive to the actuation thereof, said automatic cycle of operation comprising a plurality of events including a photographic exposure operation all occurring in a predetermined sequence with at least one of said events requiring an electrical power input for its implementation of substantially greater magnitude than the electrical power input required to implement at least another of said events occurring immediately prior to said one event; and logic and switch means for connecting one of the two batteries to said selectively actuable means in response to the actuation thereof, said logic and switch means also operating to sense the completion of said other event and subsequently responding to connect the other of the two batteries in electrical power supplementing connection to the one battery, said logic and switch means also operating to sense the completion of a said event requiring said greater electrical power input, and subsequently responding to interrupt said electrical power supplementing connection between the two batteries while also operating to sense the completion of the last of said events in said predetermined sequence which requires electrical power for its implementation and subsequently responding to terminate any electrical connection between the two batteries and said selectively actuable means.

2. The camera of claim 1 wherein said selectively actuable means includes an automatic film advance mechanism, and said logic and switch means connects the two batteries in electrical power supplementing relation with respect to each other for powering said selectively actuable means during the film advancing event of said mechanism.

3. The camera of claim 2 wherein said event occurring immediately prior to said one of said events requiring said greater electrical power is said photographic exposure operation.

4. The camera of claim 1 wherein said electrical power supplementing connection between the batteries is a parallel connection.

5. A photographic camera of the type powered by at least two batteries comprising:

selectively actuable means at least in part electrically energizable for conducting an automatic cycle of operation responsive to the actuation thereof, said automatic cycle of operation comprising a plurality of events including a photographic exposure operation all occurring in a predetermined sequence with at least one of said events requiring an electrical power input for its implementation; and logic and switch means for connecting one of the two batteries to said selectively actuable means in response to the actuation thereof, while also being responsive to said actuation for connecting the other of the two batteries in parallel electrical power supplementing connection to the one battery, said logic and switch means also operating to sense the completion of the last of said events in said predetermined sequence which requires electrical power for its implementation and subsequently responding to terminate any electrical connection between the two batteries and said selectively actuable means, while also interrupting said parallel electrical power supplementing connection between the two batteries.

* * * * *